United States Patent
Thomas et al.

[15] 3,664,938
[45] May 23, 1972

[54] ELECTRICAL COALESCENCE OF POLYMER FINES

[72] Inventors: Edward J. Thomas; Ralph E. Friedrich, both of Midland, Mich.

[73] Assignee: The Dow Chemical Company, Midland, Mich.

[22] Filed: Jan. 5, 1970

[21] Appl. No.: 788

[52] U.S. Cl. .................................................. 204/180 R
[51] Int. Cl. ................................................... B01d 21/00
[58] Field of Search .................................................. 204/180

[56] References Cited

UNITED STATES PATENTS

| | | | |
|---|---|---|---|
| 3,468,778 | 9/1969 | Hirs et al. | 204/180 |
| 2,982,749 | 5/1961 | Friedrich et al. | 260/23 EM |
| 2,900,320 | 8/1959 | Metcalfe et al. | 204/180 R |
| 3,436,326 | 4/1969 | Stober | 204/180 R |

*Primary Examiner*—F. C. Edmundson
*Attorney*—Griswold & Burdick, D. H. Thurston and C. E. Rehberg

[57] ABSTRACT

Polymer fines suspended in the organic phase recovered from the polymerization of a suspension of aqueous water-soluble monomer in an organic liquid are precipitated by deposition or agglomeration by the application of an electrical field. The process is particularly applicable to the purification for recycle of an organic medium such as xylene in the inverse suspension polymerization of acrylamide.

3 Claims, No Drawings

ELECTRICAL COALESCENCE OF POLYMER FINES

BACKGROUND OF THE INVENTION

The present invention is an improvement whereby purification of an organic solvent containing suspended polymer particles is accomplished by electrical coalescence of the suspended solids. The improvement is applicable to the polymerization process whereby an aqueous solution of a water-soluble unsaturated monomer is suspended in an oil phase and polymerized to form polymer beads.

Such a polymerization process is described by Friedrich et al. in U.S. Pat. No. 2,982,749. In the process, a water-soluble, ethylenically unsaturated monomer or combination of such monomers is dissolved in water to form a solution containing about 5–80 per cent by weight of monomer and the solution is suspended as globules of up to 2 mm. diameter in an inert hydrophobic organic liquid in the presence of a suspending agent such a low hydrophile-lyophile silanized silica, a low hydrophile-lyophile rosin amine-treated kaolin, oil-soluble ethyl cellulose, or a sulfonated polyvinyl-toluene. The organic liquid can be a liquid hydrocarbon or chlorinated hydrocarbon such as decane, toluene, xylene, propylene chloride, chlorobenzene, or the like. Representative monomers of the class described include acrylamide, methacrylamide, acrylic acid, water-soluble salts of 2-sulfoethylacrylate and vinylbenzyl sulfonate, and vinylbenzyl trimethylammonium chloride. Polymerization is accomplished by heating the suspension at moderate temperature in the presence of a free radical initiator such as peroxide or free radical-generating radiation.

In such suspension polymerization, the polymer is formed as small beads which can be separated by any convenient means and the remaining organic liquid is usually recycled to the process after suitable treatment such as filtration, centrifugation or distillation. However, such conventional purification fails to remove all remaining suspended polymer present as very fine particles which are either unfilterable or soon clog an effective filter. The cloudy organic phase may contain as much as 1 per cent by weight of such particles. The suspended matter represents both a certain amount of material waste and a complication in organic solvent recovery and recycle.

SUMMARY OF THE INVENTION

It has now been found that in a water-in-oil suspension polymerization process such as described above, the separated oil phase containing residual suspended polymer fines is conveniently and efficiently purified for recycle or other use by subjecting it to the action of an electrical field between two electroconductive surfaces, thereby precipitating at least a substantial part of the suspended fines by agglomeration or deposition on one or both of the conductive surfaces. The electrical coalescence is applicable at any temperature between the freezing point and the boiling point of the liquid organic medium, either direct or alternating current can be used, and the process can be used in a batchwise manner or in a continuous flow operation.

DETAILED DESCRIPTION

The present process is particularly adaptable to the clarification of an organic liquid such as toluene or xylene which has been recovered from the inverse suspension polymerization of acrylamide, acrylic acid, or mixtures thereof with other ethylenically unsaturated, water-soluble monomers as described in U.S. Pat. No. 2,982,749. The process is effective for removing suspended particles of surfactants, polymerization catalyst, or other such substances as well as suspended polymer fines.

Any reasonable electrical potential can be applied to the electrodes immersed in the organic liquid to be clarified with higher voltages accelerating the rate of agglomeration or deposition. Generally, a voltage in the range of 25 to about 300,000 volts/cm. is suitable, the upper limit in a particular case being the breakdown voltage of the liquid organic medium. A potential of 500–10,000 volts/cm. is a preferred operating range, depending upon the purity and conductivity of the system. Direct current is preferred although alternating current can also be used effectively.

The suspended polymer and other particles agglomerate in part and deposit on the electrodes in part. Agglomerated particles can be removed by filtration, decantation, or other suitable means. Particles deposited on an electrode will drop off for the most part on cessation of the electrical current. Any particles remaining on the electrodes are easily washed or brushed off.

The residence time required for precipitation of suspended particles in a specified volume of liquid varies according to the potential applied and the degree of precipitation desired.

The following examples illustrate various modes of operating the process of this invention.

EXAMPLE 1

A suspension of aqueous acrylamide in xylene was heated in the presence of a persulfate-peroxide catalyst as described by Friedrich et al. in U.S. Pat. No. 2,982,749 to obtain a suspension of polyacrylamide beads. The polymer beads were separated from the xylene by centrifuging, leaving a xylene mother liquor which was cloudy with suspended polymer fines. About 25 ml. of this suspension was put in a cylindrical conductivity cell of 2.8 cm. diameter with opposed curved platinum sheet electrodes 2.5 × 2.5 cm. square, 1.7 cm. apart at the near edges, centers about 2.6 cm. apart. A potential of 2,500 volts direct current was applied for 30 minutes at 0.8 milliamperes. The suspended polyacrylamide fines began to agglomerate at once with some depositing on the electrodes. After 30 minutes, the xylene in the cell was clear.

EXAMPLE 2

Another sample of the xylene phase containing suspended polyacrylamide fines was subjected to 6,000 volts alternating current. After 15 minutes, the xylene phase was essentially clear, most of the suspended polymer having agglomerated and settled to the bottom.

EXAMPLE 3

Another sample of xylene containing suspended polyacrylamide fines such as described in Example 1 was subjected to 3,100 volts direct current at one milliampere. After 30 minutes, the suspended polymer in the xylene had been reduced to 0.1 per cent by weight from an original 0.25 per cent.

EXAMPLE 4

A similar sample of xylene containing suspended polyacrylamide fines was subjected to 3,600 volts direct current at one milliampere. After 20 minutes, the suspended solids had been reduced to 0.082 per cent from an original 0.34 per cent.

We claim:

1. In the process wherein a polymer of a water-soluble ethylenically unsaturated monomer is made by forming a water-in-oil suspension of an aqueous solution of said monomer in an inert hydrophobic liquid organic dispersion medium, heat-polymerizing the suspended monomer in the presence of a polymerization initiator to obtain a disperse phase polymeric product in bead form, and the liquid organic dispersion medium is separated from the polymeric beads and the aqueous phase as a liquid organic phase containing suspended polymer fines, the improvement wherein said liquid organic phase is subjected to the action of an electric field established by a potential difference between two conducting surfaces of 500–10,000 volts/cm., thereby precipitating at least a substantial part of the suspended polymer fines.

2. The process of claim 1 wherein the polymer is polyacrylamide.

3. The process of claim 2 wherein the liquid organic dispersion medium is xylene.

* * * * *